United States Patent [19]
Davis

[11] Patent Number: 5,946,396
[45] Date of Patent: *Aug. 31, 1999

[54] SYSTEM AND METHOD FOR ENSURING INTEGRITY OF AUDIO

[75] Inventor: Derek L. Davis, Phoenix, Ariz.

[73] Assignee: Intel Corporation, Santa Clara, Calif.

[ * ] Notice: This patent is subject to a terminal disclaimer.

[21] Appl. No.: 08/738,086

[22] Filed: Oct. 25, 1996

[51] Int. Cl.$^6$ ...................................................... H04K 1/00
[52] U.S. Cl. ..................................... 380/23; 380/4; 380/5; 380/9; 380/10; 380/30; 380/49; 380/50
[58] Field of Search .................................. 380/5, 10, 23, 380/25, 4, 9, 49, 50, 59, 19, 30; 348/460, 552

[56] References Cited

U.S. PATENT DOCUMENTS

| | | | |
|---|---|---|---|
| 5,005,200 | 4/1991 | Fischer | 380/30 |
| 5,136,646 | 8/1992 | Haber et al. | 380/49 |
| 5,136,647 | 8/1992 | Haber et al. | 380/49 |
| 5,214,702 | 5/1993 | Fischer | 380/30 |
| 5,422,953 | 6/1995 | Fischer | 380/23 |
| 5,546,463 | 8/1996 | Caputo et al. | 380/25 |
| 5,724,425 | 3/1998 | Chang et al. | 380/25 |
| 5,751,809 | 5/1998 | Davis et al. | |

*Primary Examiner*—Bernarr E. Gregory
*Attorney, Agent, or Firm*—Blakely, Sokoloff, Taylor & Zafman

[57] ABSTRACT

Implemented preferably within a video camera, a cryptographic device is used to prevent audio from being fraudulently altered without detection. The cryptographic device performs a "time-bracketing" operation to preserve data integrity through implementation of a state value randomly generated after a first point of time. Time-bracketing is performed by appending the state value to an aggregate digest of at least one pair of video and audio data clips to produce an aggregate data set, and digitally signing the aggregate data set before the aggregate digest is transmitted to a centralized system for "time-stamping", resulting in a published composite digest. The aggregate data set supports that the data clips were captured after the first point of time while providing support that the data clip was captured before the second point of time.

39 Claims, 7 Drawing Sheets

SYSTEM AND METHOD FOR ENSURING INTEGRITY OF AUDIO

BACKGROUND OF THE INVENTION

1. Field of the Invention

The present invention relates to a system and method for data security. More particularly, the present invention relates to a cryptographic device which preserves the integrity of audio by preventing the audio from being unknowingly altered.

2. Description of Art Related to the Invention

As personal computers, networks and other electronic devices supporting digital data transfers have become more widely used, the importance of data security has increased dramatically. For data security to be highly reliable, it must preserve the "integrity" of data transmitted between two electronic devices by ensuring that the data is not altered during transmission. However, with advancements in electronic technology, it is becoming quite difficult to detect alterations of data.

Figure 1:
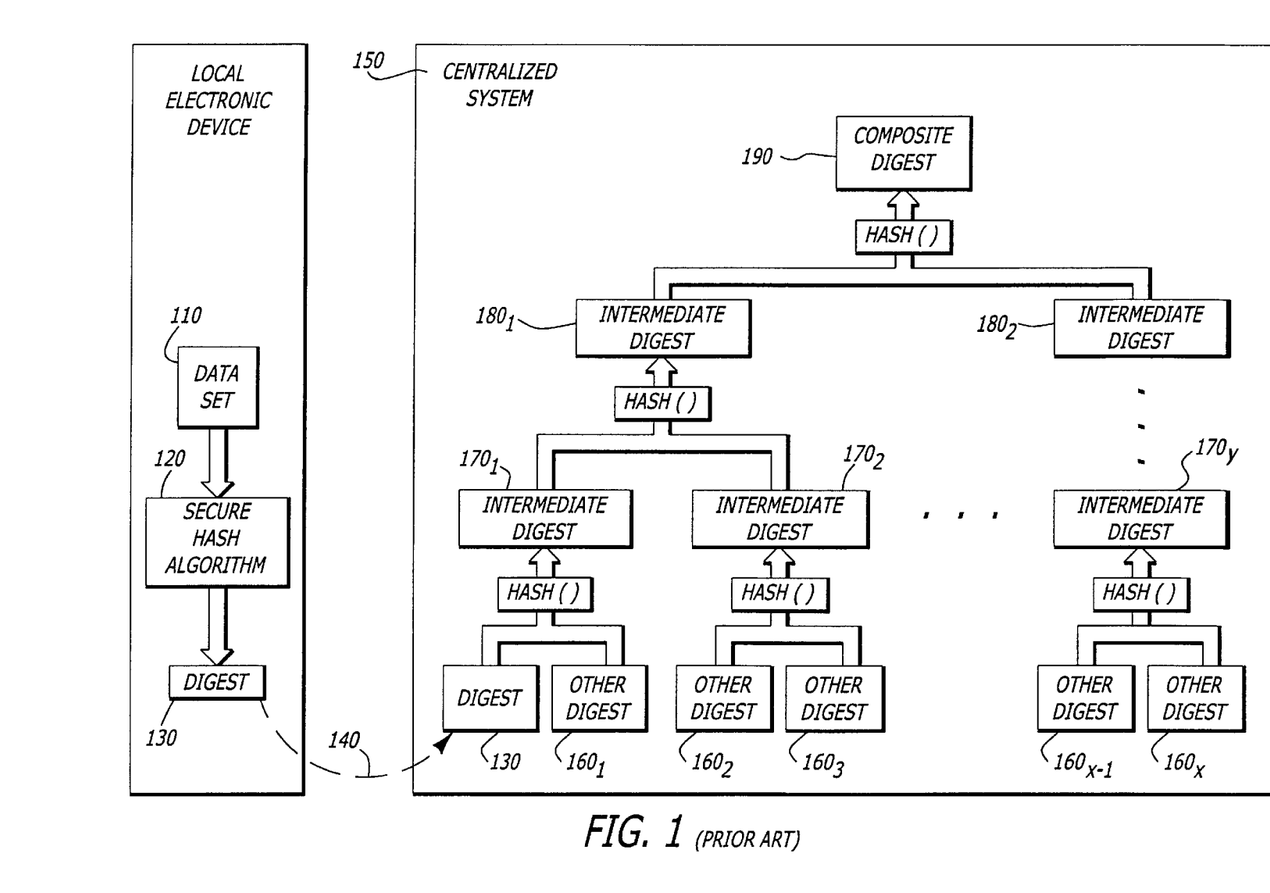
FIG. 1 is a block diagram illustrating conventional time stamping operations.

In an effort to preserve data integrity, a technique called "time stamping" has recently been developed and is commercially offered from Surety Technologies, Inc. of Chatham, N.J. As shown in FIG. 1, the time-stamping technique involves a digital data set 110, such as a stream of video as shown, being processed (or "hashed") in accordance with a cryptographically secure hash algorithm 120 (e.g., "MD5" algorithm developed by RSA Data Security, Inc. of Redwood City, Calif.). This causes the digital data set 110 to be mapped from its arbitrary size into a significantly smaller, fixed size referred to as a "digest" 130. No information about the digital data set 110 may be derived from the digest 130.

Typically, the digest 130 is electronically transferred to a centralized system 150 (e.g., a mainframe computer or a collection of personal computers) as indicated by a data path 140. Subsequently, the digest 130 in combination with a number of other digests $160_1$–$160_x$ ("x" being a positive whole number, x>1) from different electronic devices are hashed to produce an intermediate digest $170_1$–$170_y$ ("y" being a positive whole number, y>1) as shown. The variety of intermediate digests $170_1$–$170_y$ are hashed together until a composite digest 190 is generated from intermediate digests $180_1$ and $180_2$. Next, the composite digest 190 is widely published (e.g., printed in a publication, disseminated to its sources, stored in a database, etc.) to establish that the digital data set 110 was in existence at least before the publication of the composite digest 190.

While this time-stamping mechanism is useful in establishing that the digital data set 110 existed before the publication date, there is no current mechanism to "time-bracket" data, in this case video and its complementary audio, to indicate that both the audio and video were captured within the prescribed period of time ranging from a first time period to a second time period.

SUMMARY OF THE INVENTION

The present invention relates to a system that ensures integrity of a plurality of data clips (e.g., a video data clip and a corresponding audio data clip) to be captured between a first point of time and a second point of time. The system comprises a first electronic device and a centralized system, both of which being in communication with each other. The first electronic device includes circuitry that (i) captures the plurality of data clips, (ii) performs hash and arithmetic operations on the plurality of data clips to produce an aggregate digest, (iii) combines a unique state value available at the first period of time with the aggregate digest, (iv) digitally signs the state value and the aggregate digest to produce an aggregate data set. The centralized system receives the aggregate digest from the first electronic device, and produces a composite digest at the second period of time.

BRIEF DESCRIPTION OF THE DRAWINGS

The features and advantages of the present invention will become apparent from the following detailed description of the present invention in which.

DESCRIPTION OF THE PREFERRED EMBODIMENT

The present invention relates to a communication system that is designed to preserve the integrity of audio and its corresponding method of operation. The system includes an electronic device implemented with a cryptographic device. The electronic device may include, but is not limited to, a video camera or a still picture camera with audio captions. Thus, it is contemplated that the cryptographic device and method of operation described below may be practiced by other electronic devices besides those explicitly mentioned herein.

In the following description, some terminology is used to discuss certain well-known cryptographic functions. For example, a "frame" is information digitized into binary data and acquired for display or playback, normally sufficient data to provide a full-screen view of an image. A "data clip" includes one or more frames of data including video, text or audio. An "aggregate" clip is a data clip including at least one frame of video interleaved with or concatenated to its complementary audio. The aggregate clip is continuously updated as more video and audio data clips are captured. An "aggregate" digest is a result value obtained after hashing either the aggregate clip or a plurality of digests. A "key" is an encoding and/or decoding parameter used by conventional cryptographic algorithms; namely, Rivest, Shamir and Adleman ("RSA"), Data Encryption Algorithm as specified in Data Encryption Standard ("DES") and the like. A "digital certificate" is defined as any digital information, typically a public key associated with an entity, encrypted by a private key held by another entity such as a manufacturer or a widely published trusted authority (e.g., bank, governmental entity, trade association, etc.). A "digital signature" is similar to a certificate, but is typically used for authenticating data.

Figure 2:
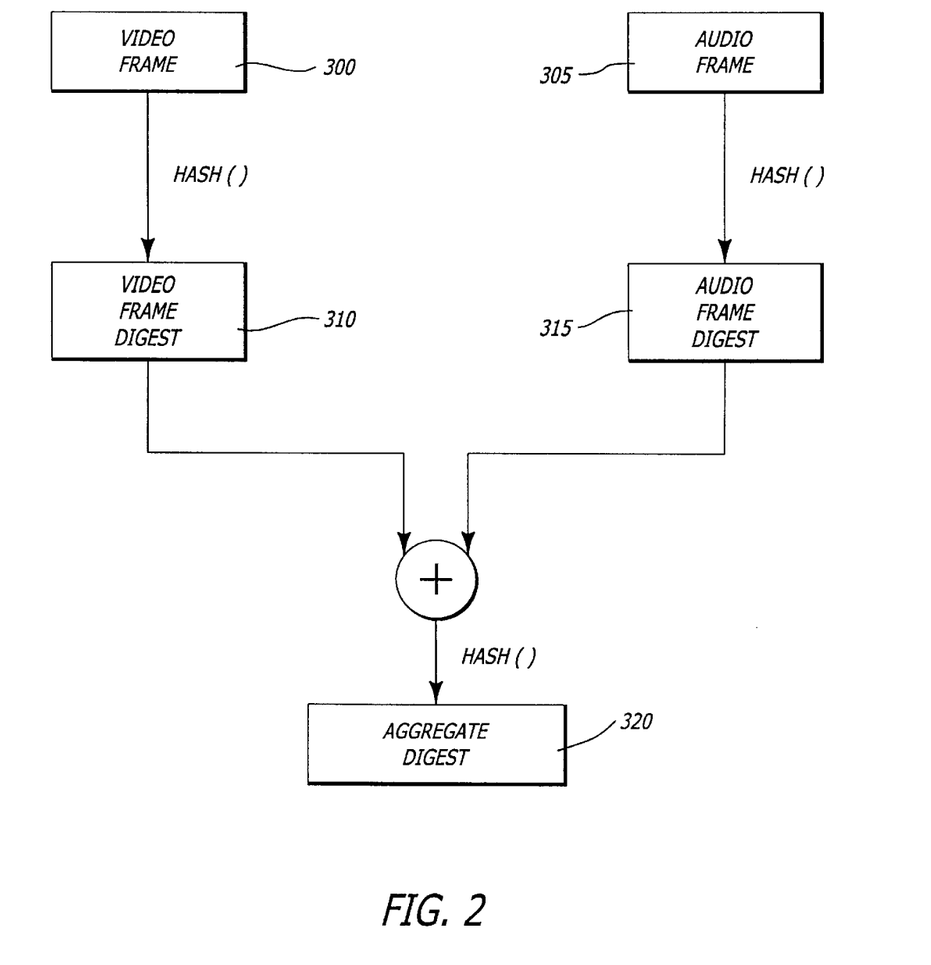
FIG. 2 is a block diagram illustrating the cryptographic operations being performed on a frame-by-frame basis by a cryptographic device protecting the integrity of the audio.
Figure 3:
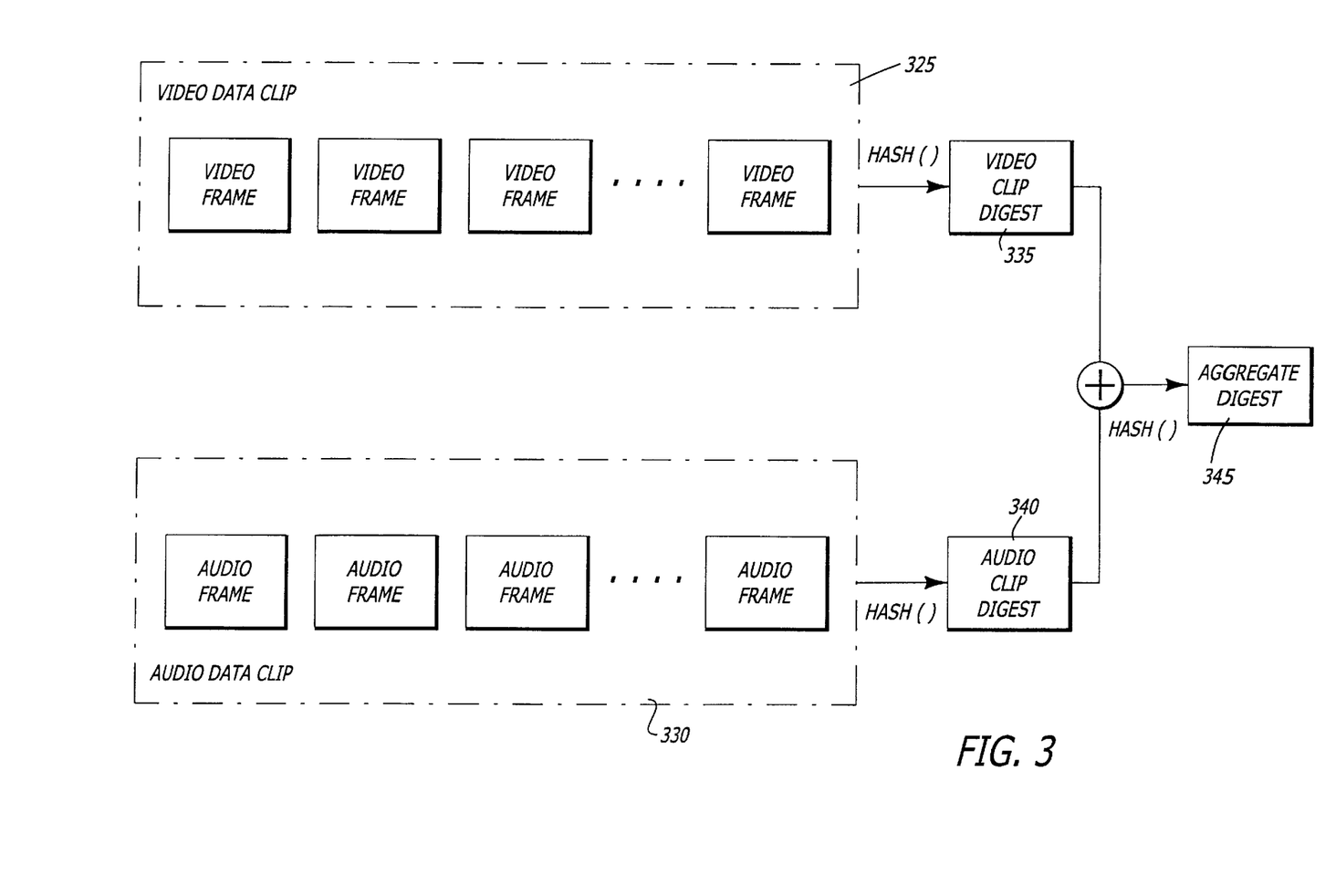
FIG. 3 is a block diagram of a second embodiment illustrating cryptographic operations being performed on multiple frame data clips by a cryptographic device protecting the integrity of the audio.

As described herein, a cryptographic device (see FIG. 4) is implemented within an electronic device (e.g., video camera) to capture at least one video data clip and its complementary audio. To prove that the data clips were captured during a time period ranging from a first point of time ("first time point") to a second point of time ("second time point"), the data clips are modified through hash and arithmetic operations to produce an aggregate digest as shown in FIGS. 2 and 3. Although not shown, it is contemplated that the aggregate digest may be produced through one of a number of schemes. For example, the aggregate digest may be produced by processing the data clips in their entirety to produce an intermediate aggregate clip which may be stored locally within the electronic device. Thereafter, a hash operation may be performed on the aggregate clip to produce the aggregate digest.

The aggregate digest, along with various information uniquely available at the first time point (e.g., a state value defined below), may be digitally signed to produce a digital signature referred to herein as an "aggregate data set". As described below, through storage of the data clips, the aggregate data set, and the state value, this information may be used to verify that the data clips were captured after the first time point. By submitting the aggregate digest to a time-stamping scheme as set forth in FIG. 1 and obtaining various information about the time-stamping scheme, further verification that the data clips were captured by the electronic device before the second time point, namely the publication date of the composite digest being partially based on the aggregate digest, is possible (see FIGS. 6A and 6B).

Referring to FIG. 2, for single frame processing, the cryptographic device captures both a video data clip 300 and its complementary audio data clip 305, both data clips being illustrated as a single frame of data. Upon capturing the data clips, a hashing operation may be performed on both data clips 300 and 305 to produce a video frame digest 310 and an audio frame digest 315, respectively. The hashing operations involve a cryptographic hash algorithm which modifies input data to produce output data of a fixed size. Examples of the cryptographic hash algorithm include MD2 and MD5 (provided by RSA Data Security of Redwood City, Calif.) or Secure Hash Algorithm ("SHA-1") specified by the National Institute of Standards and Technology located in Washington, D.C.

Thereafter, these digests 310 and 315 may be concatenated and input into the hash algorithm to produce an aggregate digest 320. Normally, the hash algorithms are the same, although different types of algorithms may be used. Next, the aggregate digest 320 is a portion of the information that may be stored locally for subsequent distribution outside the electronic device having the cryptographic device, or routed to a destination node such as the centralized system as shown in FIG. 1.

Similarly, for multi-frame processing as shown in FIG. 3, the cryptographic device captures both a video data clip 325 and an audio data clip 330. These data clips 325 and 330, featuring multiple frames, undergo hashing operations to produce the video clip digest 335 and a corresponding audio clip digest 340. These digests are concatenated and input into the hash algorithm to produce an aggregate digest 345. Thereafter, the aggregate digest 345 is transmitted as previously described.

It is contemplated that the aggregate digest produced for individual or multiple frame data clips may be obtained by other aggregation techniques besides concatenation. For example, an aggregation technique may include interleaving the video and audio data clips. However, the use of an interleaving scheme may preclude subsequent authentication of either video or audio as separate data. Moreover, it is further contemplated that the data clips 300 and 305 or 325 and 330 may be initially concatenated to produce an aggregate clip and then, subsequently, hashed to obtain the aggregate digest.

Figure 4:
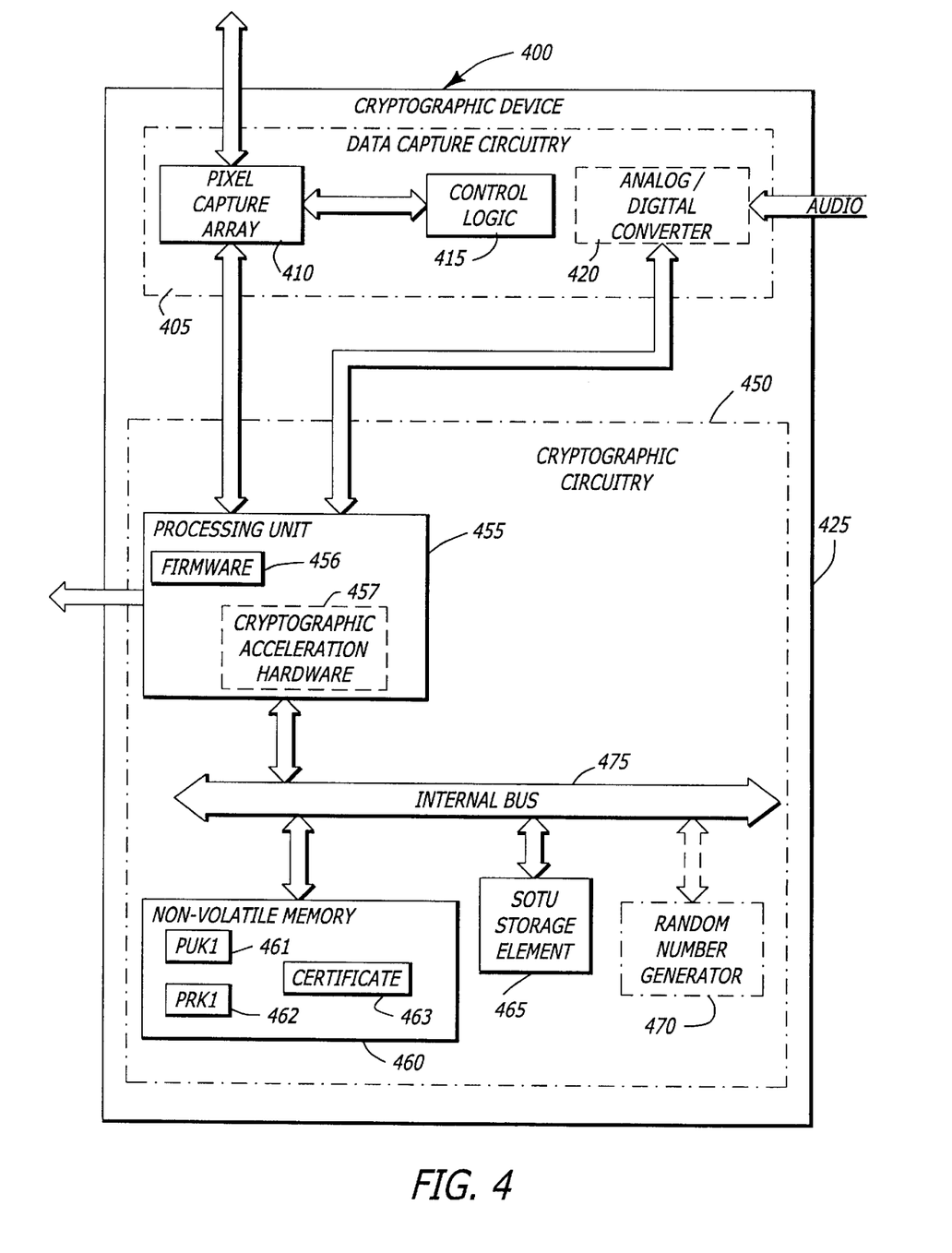
FIG. 4 is a block diagram of an embodiment of a cryptographic device performing the operations of FIGS. 2–3.

Referring now to FIG. 4, one embodiment of the cryptographic device is shown. The cryptographic device 400 comprises a data capture circuitry 405 and cryptographic circuitry 450, both of which may be integrated into one integrated circuit ("IC") package 425 to reduce vulnerability to physical tampering. It is contemplated, however, that the cryptographic device 400 may be segregated into separate IC packages so long as there exists cryptographically protected communications between the IC packages.

As further shown in FIG. 4, data capture circuitry 405 may include a sensor pixel capture array 410 and control logic 415 controlling the pixel capture array 410. Examples of the sensor are a Charge Coupled Device "CCD" sensor (the standard sensor used in camcorders) or any sensor based on standard integrated circuit technology. The data capture circuitry 405 may further include an analog-to-digital ("A/D") converter 420 to convert audio into a digital format. It is contemplated, however, that the A/D converter 420 may be implemented outside the data capture circuitry 405 or is not necessary if the audio has already been digitized.

The cryptographic circuitry 450 may be implemented onto the same silicon as the data capture circuitry 405 or implemented on different silicon. The cryptographic circuitry 450 comprises a processing unit 455 coupled to a nonvolatile memory 460 (e.g., programmable memory such as EPROM or EEPROM, flash memory and the like) and a State of the Universe ("SOTU") storage element 465 through an internal bus 475. Optionally, as represented by dashed lines, a random number generator 470 may be coupled to the internal bus 475 to assist in internal production of the public and private key pair 461-462 of the cryptographic device 400 at manufacture for example.

The processing unit 455 includes firmware 456 such as internal memory (e.g., flash memory, read-only memory "ROM", random access memory "RAM", etc.). The internal memory is used to contain asymmetric key programs (e.g., "RSA", Digital Signature Standard "DSS", Ellipse curve, etc.) and a cryptographic hash algorithm that are executed by the processing unit 455 in order to digitally sign information and to perform hash operations, respectively. The internal memory is further used to contain the aggregate digest as described below. Optionally, as denoted by the dashed line representation, cryptographic acceleration hardware 457 may be employed into the processing unit 455 for speed enhancement.

The non-volatile memory 460 is configured to contain a unique public and private key pair (e.g., public key "PUK1" 461 and a private key "PRK1" 462) associated with this cryptographic device 400. The non-volatile memory 460 further includes a digital certificate 463 used for verification purposes described in FIGS. 6A and 6B.

The SOTU storage element 465 may be arranged to store a substantial number of data bits, typically ranging from approximately 100 bits to approximately 288 bits. It is contemplated that the selected number of bits is a design choice. The SOTU storage element 465 is loaded under system control with state information ("state value") from a source external to the cryptographic device. The SOTU storage element 465 may be reloaded at any time prior to capturing video and audio clips which rely on this state information. The state value is generated at a particular point in time and in such a way as to be unpredictable at any time prior to that point. For example, the state value may be a composite digest, which is a hash value of potentially millions of data sets virtually unpredictable prior to the moment of its publication, provided by the time stamping service provider.

The random number generator 470 may be used to generate the unique public and private keys 461-462 without exposing such keys to an environment outside the confines of the IC package 425. As denoted by the dashed line representation, its use is optional, depending on whether this cryptographic functionality is desired.

Figure 5:
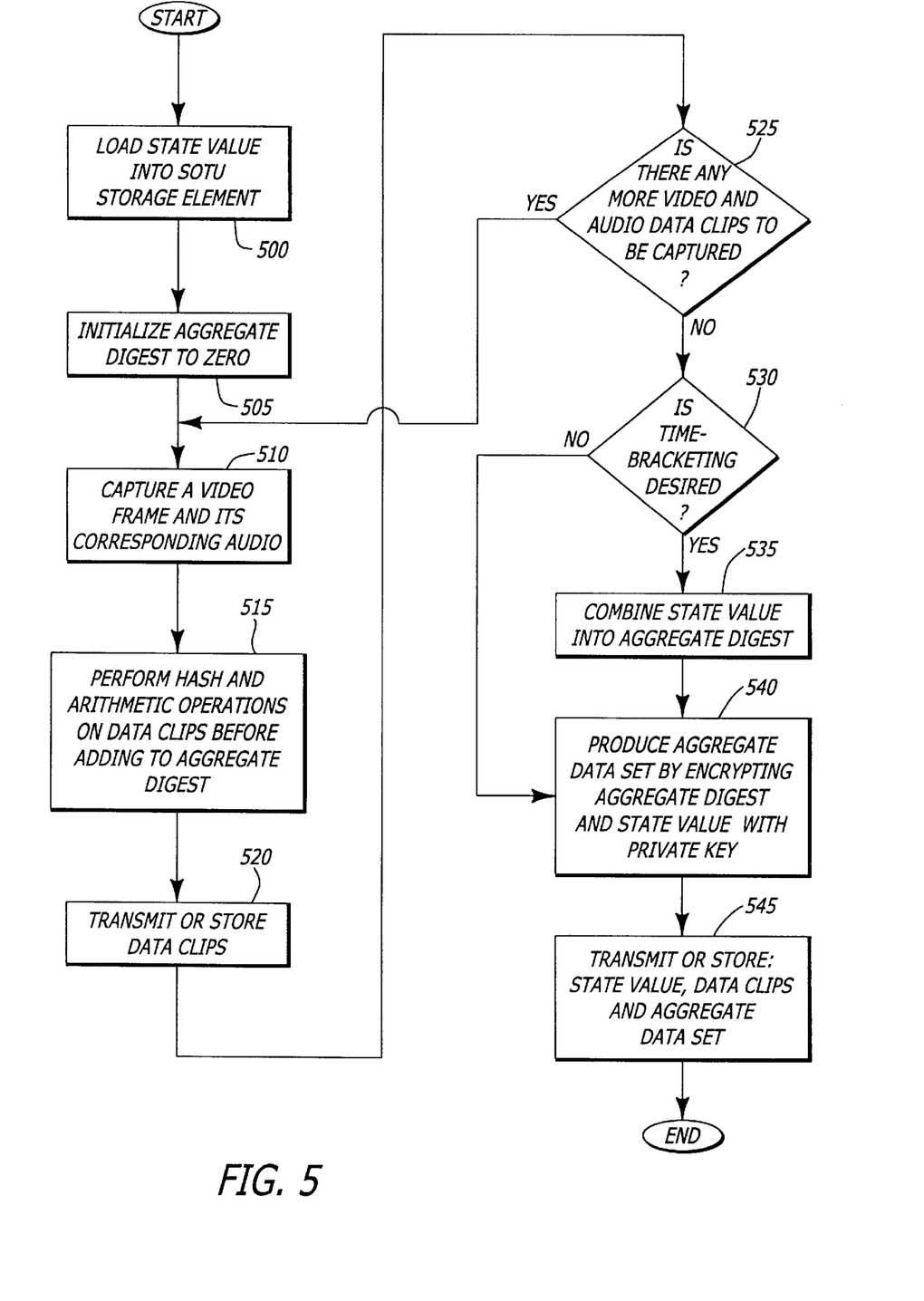
FIG. 5 is a flowchart showing those procedural steps undertaken by the cryptographic device of FIG. 4 in protecting the integrity of a captured audio and video data clips through a time-bracketing scheme.

Referring now to FIG. 5, the operational steps performed by the cryptographic device in protecting the integrity of the audio information are illustrated. Prior to capturing the aggregate digest, the SOTU storage element is initialized by loading the state value (Step 500). The state value cannot be changed once data is beginning to be captured by the cryptographic device. In addition, an internally-stored aggregate digest is initialized to zero (Step 505). The aggregate digest is a continuously updated hash value that is created prior to transmission to the centralized system to complete the time-bracketing scheme. At Step 510, a video data clip is captured by the sensor of the cryptographic device (e.g., the pixel sensor array of the CCD) and an audio data clip, corresponding to the video data clip, is captured and converted, if necessary, to a digital format.

Next, these data clips undergo hashing and arithmetic operations to form the aggregate digest (Step 515). Thereafter, the video and audio data clips may be stored locally or transmitted to a remote electronic device used for subsequent verification if needed (Step 520). Optionally, these data clips may be encrypted (for privacy purposes) prior to such storage or transmission. If a video and audio clip are being captured, where a digital signature is not required on each pair of audio and video data clips, and more data clips are to be captured, the process captures another video and audio data clips (Step 525). If no more data clips are to be captured, or only one pair of video and audio frames is being captured, the process continues to Step 530.

At Step 530, a decision is made as to whether the clip is to be time-bracketed using the state value contained in the SOTU storage element. If time-bracketing is desired, the state value is appended to the aggregate digest, and collectively, is digitally signed using the private key "PRK1" of the cryptographic device to produce the aggregate data set (Steps 535–540). Finally, in Step 545, the aggregate digest is transmitted to the centralized system while the plurality of data clips, the state value and the aggregate data set may be stored locally or transmitted to the remote electronic device to allow subsequent analysis to verify validity when needed.

It is contemplated that this time-bracketing technique cannot be used effectively when the operations of capturing the data clips of video and audio, and digitally signing a resultant aggregate data set of these clips are not "atomic" such as when the operations are performed independently. The reason is that if the clips would be available to software or other inherently insecure data handling systems, one cannot be sure that the data clips were created at an earlier point in time while the state value is loaded before digitally signing the aggregate data set. The salient feature is that the contents of the SOTU storage element are established prior to the capture of the data clips. The SOTU storage element may not (by device design) be loaded between Steps 510 and 545.

Figure 6A:
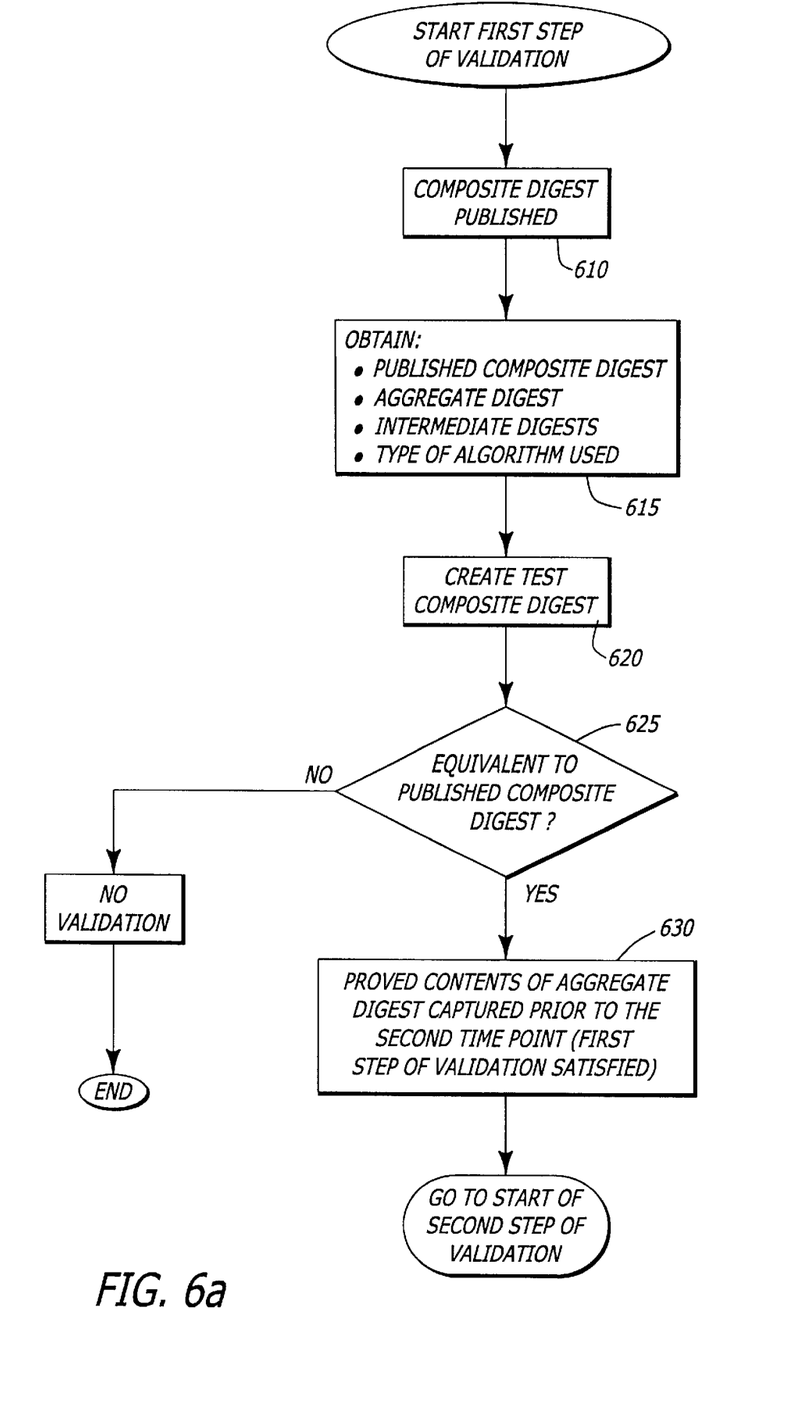
FIGS. 6A and 6B make up a flowchart illustrating a validation process of the aggregate data set to ensure the integrity of the captured audio and video data clips.
Figure 6B:
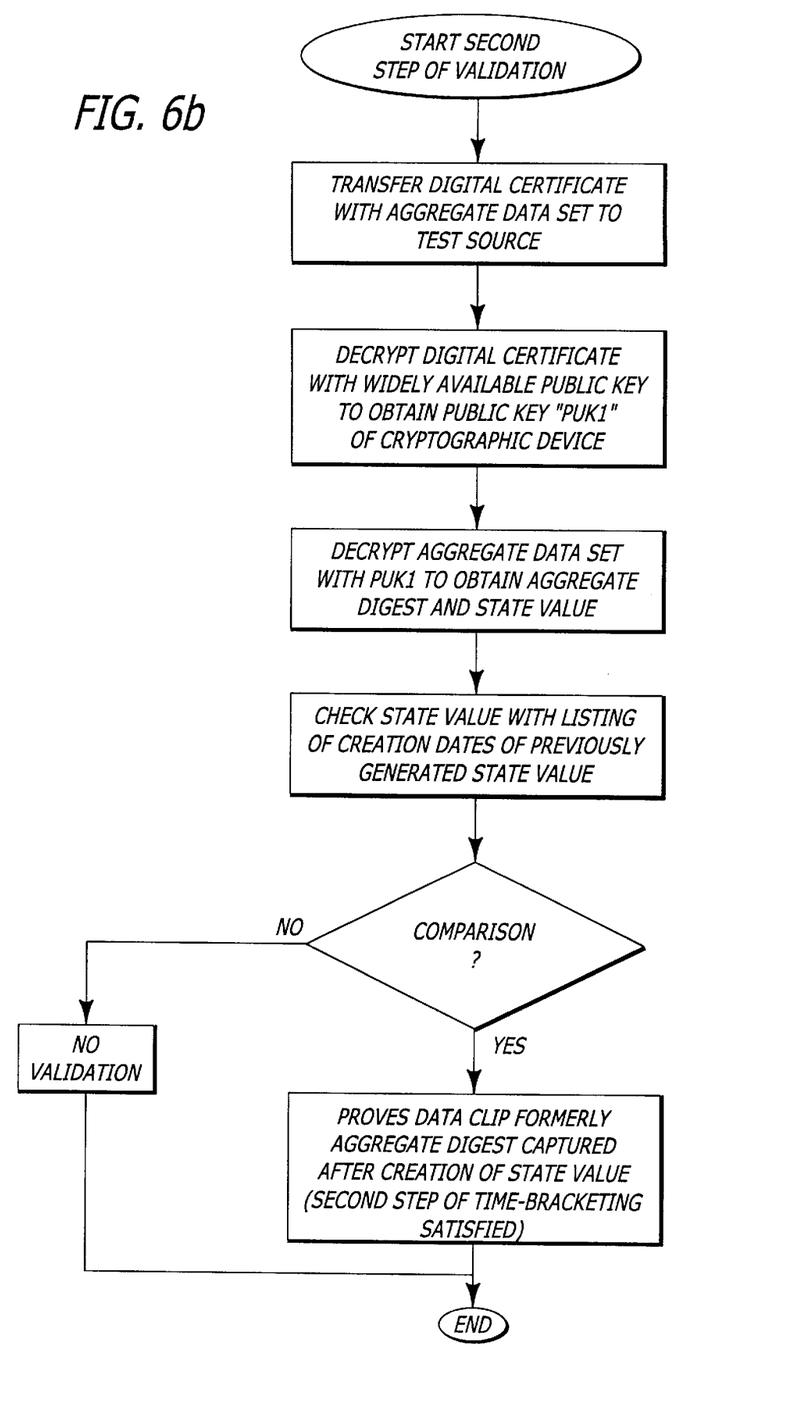

Referring now to FIGS. 6A-6B, an embodiment of the validation process used to verify that an audio clip was captured after a first time point but before a second time point after performing the operations of FIG. 5 is shown. In FIG. 6A, a first step of the validation process is to verify that the audio clip was captured before the second time point. This step is performed by utilizing the centralized system similar to that set forth in FIG. 1 to produce the published composite digest (Step 610). To prove that the data clips were captured before the second time point, such as the publication date of the composite digest that includes the aggregate digest, the following information is necessary: (i) the published composite digest, (ii) the aggregate digest, (iii) various intermediate digests forming the composite digest (e.g., digests $160_1$, $170_2$ and $180_2$ as shown in FIG. 1 if the aggregate digest is transmitted in lieu of the digest 130), and (iv) the type of hash algorithm used (Step 615). From this information, a test composite digest can be created and compared with the published composite digest (Steps 620–625). If the test composite digest is identical to the published composite digest, it is clear that the data clips used from the aggregate digest, formed in part by the audio clip, must have been captured prior to the publication of the composite digest (Step 630).

Referring now to FIG. 6B, a second step in the validation process is to establish that the data clips, including the audio clip, were captured after the first time point. To accomplish the second step, a number of sub-steps are performed. First, it is necessary to establish that the aggregate data set originated from the electronic device containing the cryptographic device, not from a fraudulent source. If the test system is remotely located, for example, the digital certificate along with the aggregate data set and the data clips are transferred from their storage location to the test system (Step 650). The widely available public key of the entity that encrypted the digital certificate with its private key is used to decrypt the digital certificate to obtain the public key of the electronic device containing the cryptographic device (Step 655). Then, this public key is used to decrypt the aggregate data set to obtain the aggregate digest and the state value appended thereto (Step 660). From that, the state value may be compared with a possible list of previously generated state values and their corresponding times of creation to obtain the earliest point in time, namely the first time point, when the data clips forming the aggregate digest could have been created (Step 665).

It is an optional step to perform hash and arithmetic operations on the aggregate digest to recover the data clips for comparison with the data clips previously transferred to the test system. In any event, collectively, the validation process set forth in FIGS. 6A-6B may be used to confirm that the data clips are captured between the first and second time points.

While various embodiments of the invention have been described, those skilled in the art will realize that other embodiments of the invention are easily foreseeable without departing from the spirit and scope of the present invention. Moreover, well known circuitry and operational steps are not set forth in detail in order to avoid unnecessarily obscuring the present invention. The invention should, therefore, be measured in terms of the following claims.

What is claimed is:

1. A system for determining whether a plurality of data clips, including a video data clip and a corresponding audio data clip, are captured between a first point of time and a second point of time, the system comprising:
 a first electronic device including logic to produce an aggregate data set by digitally signing (i) a periodically changing state value available at the first point of time, and an aggregate digest being a result formed by hash and arithmetic operations on the plurality of data clips; and
 a centralized system in communication with the first electronic device, the centralized system to receive the aggregate digest from the first electronic device, and to produce a composite digest at the second period of time.

2. The system according to claim 1, wherein the first electronic device further including logic to store the aggregate data set, the plurality of data clips and the state value.

3. The system according to claim 1 further including a second electronic device coupled to the first electronic device, said second electronic device including logic to store the aggregate data set, the plurality of data clips and the state value.

4. The system according to claim 1, wherein the first electronic device to perform verification that the plurality of data clips were captured between the first point of time and the second point of time by analyzing and comparing the contents of the composite digest and the aggregate data set.

5. The system according to claim 1, wherein the logic of the first electronic device includes:
 a sensor to capture the plurality of data clips; and
 a cryptographic circuit coupled to the sensor, the cryptographic circuit including
  an internal bus,
  a first storage element coupled to the internal bus, the first storage element being loaded with the state value prior to the sensor beginning to capture the plurality of data clips, and
  a processing unit coupled to the internal bus.

6. The system according to claim 5, wherein the cryptographic circuit further includes a non-volatile memory element coupled to the internal bus, said non-volatile memory element to contain a unique public key and a unique private key associated with the unique public key.

7. The system according to claim 5, wherein the cryptographic circuit further includes a random number generator coupled to the internal bus.

8. The system according to claim 5, wherein the processing unit of the cryptographic circuit to (i) receive the plurality of data clips from the sensor, (ii) produce a plurality of digests associated with the plurality of data clips, (iii) perform hash operations on each of the plurality of digests and combine results of the hash operations to produce the aggregate digest, and (iv) digitally sign the state value and the aggregate digest to produce the aggregate data set.

9. The system according to claim 5, wherein the cryptographic circuit further includes a volatile memory element to contain at least the aggregate digest.

10. The system according to claim 5, wherein the sensor includes a pixel capture array and control logic controlling the pixel capture array.

11. The system according to claim 10, wherein the sensor further includes an analog-to-digital converter.

12. The system according to claim 1, wherein the aggregate data set includes an encrypted format of the state value concatenated to the aggregate digest.

13. The system according to claim 1, wherein the aggregate data set includes an encrypted format of the state value interwoven with data associated with the aggregate digest.

14. The system according to claim 1, wherein the logic performing the hash and arithmetic operations comprises (i) logic to concatenate each of the plurality of data clips, and (ii) logic to perform the hash operation on a concatenated version of the plurality of data clips to produce the aggregate digest.

15. The system according to claim 1, wherein the logic performing the hash and arithmetic operations comprises (i) logic to interleave data associated with each of the plurality of data clips to produce a sequence of data, and (ii) logic to perform the hash operation on the sequence of data to produce the aggregate digest.

16. The system according to claim 1, wherein the periodicity in changing the state value is random by nature.

17. The system according to claim 16, wherein the state value remains static once one of the plurality of data clips begins to be captured by the first electronic device.

18. The system according to claim 17, wherein the state value is changed before a next plurality of data clips are captured.

19. A system ensuring integrity of a plurality of data clips, including a video data clip and a corresponding audio data clip, to be captured between a first point of time and a second point of time, the system comprising:
 electronic means for processing the data clips, said electronic means including
  sensing means for capturing the plurality of data clips after the first point of time, and
  cryptographic means for performing hash and arithmetic operations on the plurality of data clips to produce an aggregate digest, for combining the aggregate digest with a periodically changing state value loaded into the electronic means at the first period of time, for digitally signing the state value and the aggregate digest to produce an aggregate data set, and for storing at least the aggregate data set; and
 centralized means for receiving the aggregate digest from the electronic device, and for producing a composite digest at the second period of time, said centralized means being in communication with the electronic means.

20. The system according to claim 19, wherein the cryptographic means includes logic to perform a hash operation on each of the plurality of data clips to produce a plurality of hash results, and logic to concatenate each of the plurality of hash results to produce the aggregate digest.

21. A method for preserving integrity of audio by ensuring that the audio has been captured after a first point of time and before a second point of time, the method comprising:
 combining a periodically changing state value with an aggregate digest;
 digitally signing the aggregate digest and the state value to produce an aggregate data set; and
 outputting the aggregate digest to be incorporated within a composite digest published at the second point of time.

22. The method according to claim 21, wherein the state value is unique.

23. The method according to claim 21, wherein the act of combining includes appending the state value to the aggregate digest.

24. The method according to claim 21, wherein the act of combining includes interleaving the state value with the aggregate digest.

25. The method of claim 21, wherein prior to the combining the state value with the aggregate digest, the method further comprising:

loading the state value created at the first period of time within a first storage element the electronic device;

capturing the plurality of data clips by the electronic system; and producing the aggregate digest from the plurality of data clips.

26. The method according to claim 25, wherein the act of producing the aggregate digest includes:

producing an aggregate data clip by performing hash and arithmetic operations on the plurality of data clips; and producing an aggregate digest by performing hash operations on the aggregate data clip.

27. An electronic device comprising:

circuitry to perform operations on a plurality of data clips to form an aggregate digest; and circuitry to digitally sign a periodically changing state value, available at the first point of time, in combination with the aggregate digest.

28. The electronic device according to claim 27, further comprising circuitry to capture the plurality of data clips.

29. The electronic device according to claim 28, wherein the capture circuitry comprises a sensor including a pixel capture array and control logic controlling the pixel capture array.

30. The electronic device according to claim 28, wherein the capture circuitry comprises a sensor including an analog-to-digital converter.

31. The electronic device according to claim 27, wherein the plurality of data clips include a video data clip and an audio data clip.

32. The electronic device according to claim 27, wherein the periodicity in changing of the state value is random by nature.

33. The electronic device according to claim 27, wherein the operations include hash operations.

34. The electronic device according to claim 33, wherein the operations include arithmetic operations.

35. The electronic device according to claim 27, wherein the digital signing circuitry includes:

an internal bus;

a first storage element coupled to the internal bus, the first storage element being loaded with the state value prior to capturing the plurality of data clips; and a processing unit coupled to the internal bus.

36. The electronic device according to claim 35, the digital signing circuitry further comprising a non-volatile memory element coupled to the internal bus, said non-volatile memory element to contain a unique public key and a unique private key associated with the unique public key.

37. The electronic device according to claim 36, wherein the digital signing circuitry further comprises a random number generator coupled to the internal bus.

38. The electronic device according to claim 35, wherein the processing unit of the digital signing circuitry further produces a plurality of digests associated with the plurality of data clips and performs hash operations on each of the plurality of digests and combine results of the hash operations to produce the aggregate digest.

39. The electronic device according to claim 35, wherein the cryptographic circuit further includes a volatile memory element to contain at least the aggregate digest.

* * * * *